(12) United States Patent
Zhang et al.

(10) Patent No.: US 11,927,368 B1
(45) Date of Patent: Mar. 12, 2024

(54) PREFABRICATED ENERGY PILE, CONSTRUCTION METHOD, AND HEAT PUMP HEAT EXCHANGE SYSTEM

(71) Applicant: CCCC CONSTRUCTION GROUP CO., LTD., Beijing (CN)

(72) Inventors: Kesheng Zhang, Beijing (CN); Wenchao Liu, Beijing (CN); Yufeng Liu, Beijing (CN); Zhiwei Yu, Beijing (CN); Zhuohua Song, Beijing (CN)

(73) Assignee: CCCC CONSTRUCTION GROUP CO., LTD., Beijing (CN)

( * ) Notice: Subject to any disclaimer, the term of this patent is extended or adjusted under 35 U.S.C. 154(b) by 0 days.

(21) Appl. No.: 18/206,848

(22) Filed: Jun. 7, 2023

Related U.S. Application Data (63) Continuation of application No. PCT/CN2022/134131, filed on Nov. 24, 2022.

(30) Foreign Application Priority Data

Sep. 16, 2022 (CN) .......................... 202211131495.2

(51) Int. Cl.
*F24T 10/17* (2018.01)
*F24F 5/00* (2006.01)

(52) U.S. Cl.
CPC ............ *F24T 10/17* (2018.05); *F24F 5/0046* (2013.01); *F24F 2005/0057* (2013.01)

(58) Field of Classification Search
CPC ......... F24T 10/15; F24T 10/17; F24F 5/0046; F24F 2005/0057

(Continued)

(56) References Cited

U.S. PATENT DOCUMENTS 4,277,946 A * 7/1981 Bottum .................. F25B 30/06
62/235
5,623,986 A 4/1997 Wiggs
(Continued)

FOREIGN PATENT DOCUMENTS

CN 1934396 A 3/2007
CN 201407855 Y * 2/2010 ............... F24J 3/084
(Continued)

OTHER PUBLICATIONS

International Search Report of Corresponding Application PCT/CN2022/134131; dated May 10, 2023; 5 Pgs.

*Primary Examiner* — Jianying C Atkisson
*Assistant Examiner* — For K Ling
(74) *Attorney, Agent, or Firm* — Cooper Legal Group, LLC (57) ABSTRACT

Disclosed are a prefabricated energy pile, a construction method and a heat pump heat exchange system. The energy pile includes a pile body and a heat exchange pipeline. The pile body includes a stainless steel pipe, a metal lining pipe extending within the stainless steel pipe and a concrete pipe between the metal lining pipe and the stainless steel pipe. A heat conductor between the stainless steel pipe and the metal lining pipe is in contact connection with the stainless steel pipe and the metal lining pipe. The heat exchange pipeline includes a first pipe section and a second pipe section in communication with each other, through which a heat exchange medium flows in turn. Tops of the first pipe section and the second pipe section protrude upward out of the energy pile. The second pipe section is in contact connection with the metal lining pipe.

9 Claims, 6 Drawing Sheets

(58) Field of Classification Search
USPC .......................................................... 62/260
See application file for complete search history.

(56) References Cited

U.S. PATENT DOCUMENTS

| | | | | |
|---|---|---|---|---|
| 5,816,314 | A * | 10/1998 | Wiggs | F24T 10/15 |
| | | | | 165/45 |
| 7,363,769 | B2 * | 4/2008 | Kidwell | F28D 7/12 |
| | | | | 62/260 |
| 9,777,969 | B2 * | 10/2017 | Yang | F28D 20/0052 |
| 2010/0059198 | A1 * | 3/2010 | Amann | F24T 10/15 |
| | | | | 165/45 |
| 2017/0087607 | A1 * | 3/2017 | Carey | F24T 10/17 |
| 2017/0292792 | A1 * | 10/2017 | Yokomine | F03G 7/04 |

FOREIGN PATENT DOCUMENTS

| | | |
|---|---|---|
| CN | 202675974 U | 1/2013 |
| CN | 207114480 U | 3/2018 |
| CN | 212004737 U | 11/2020 |
| CN | 215053333 U | 12/2021 |
| CN | 115978817 A | 4/2023 |
| JP | 2014219165 A | 11/2014 |

\* cited by examiner

PREFABRICATED ENERGY PILE, CONSTRUCTION METHOD, AND HEAT PUMP HEAT EXCHANGE SYSTEM

CROSS-REFERENCE TO RELATED APPLICATION

This application is a continuation of PCT application serial no. PCT/CN2022/134131, filed on Nov. 24, 2022, which claims the priority and benefit of Chinese patent application serial no. 202211131495.2, filed on Sep. 16, 2022. The entireties of PCT application serial no. PCT/CN2022/134131 and Chinese patent application serial no. 202211131495.2 are hereby incorporated by reference herein and made a part of this specification.

TECHNICAL FIELD

The present application relates to the technical field of pile foundation engineering, and, in particular to a prefabricated energy pile, a construction method, and a heat pump heat exchange system.

BACKGROUND

Energy pile is a pile with dual functions of foundation bearing and heat exchange by burying a heat exchanger device in the building pile foundation for shallow low temperature geothermal energy exchange. Transfer of shallow geothermal energy with low temperature as well as extraction and use of geothermal energy are realized through the heat exchange pipes buried in the pile foundation.

A prefabricated energy pile in related technology is generally a hollow cylindrical concrete pile with an embedded reinforcement cage. Heat exchange pipes in form of a "U", "W", parallel "U" or parallel "W" are then placed into the energy pile. The formed energy pile is buried underground for support and heat exchange.

As to the above related technology, concrete has a relative low thermal conductivity, thus limiting the heat exchange efficiency between the heat exchange medium in the heat exchange pipe and the geothermal energy.

SUMMARY

In order to improve the heat exchange efficiency between the heat exchange pipe and the geothermal energy, a prefabricated energy pile and a construction method, a heat pump heat exchange system are proposed.

The following technical solutions are used by the construction method and prefabrication method of energy pile, and a heat pump heat exchange system proposed.

First, the prefabricated energy pile includes a pile body and a heat exchange pipeline. The pile body includes a stainless steel pipe, a metal lining pipe extending within the stainless steel pipe and a concrete pipe between the metal lining pipe and the stainless steel pipe. A heat conductor is provided between the stainless steel pipe and the metal lining pipe, the heat conductor is in contact connection with both the stainless steel pipe and the metal lining pipe at the same time.

The heat exchange pipeline includes a first pipe section and a second pipe section in communication with each other. Tops of both the first pipe section and the second pipe section protrude upward out of the energy pile. The second pipe section is in contact connection with the metal lining pipe.

By the above technical solution, heat is conducted by contact to the heat exchange pipeline through the stainless steel pipe and the metal liner pipe, which improves heat transfer efficiency from shallow underground to the heat exchange pipeline. At the same time, the stainless steel pipe and the metal lining pipe are able to define the shape of the concrete pipe, so that the entire energy pile can be prefabricated directly by prefabrication, which reduces the defects such as hole enlargement, necking, and mud entrapment due to the concrete infusion underground.

Optionally, the second pipe section is spiral-shaped.

By the above technical solution, the contact area between the heat exchange medium and the metal lining pipe is increased to a certain extent, thereby improving the heat exchange efficiency of the energy pile to a certain extent.

Optionally, a spiral-shaped embedding recess adapted to the heat exchange pipeline is provided at the metal lining pipe, the second pipe section is embedded in the embedding recess.

By the above technical solution, the contact area between the metal lining pipe and the second pipe section is further increased, thereby improving the heat exchange efficiency of the energy pile to a certain extent.

Optionally, the heat conductor comprises a top ring, a base and a plurality of connecting bolts, an outer circumference wall of the base fixedly abuts against an inner circumference wall of a bottom end of the stainless steel pipe, a positioning hole is provided at an upper surface of the base, the positioning hole is configured to be inserted for fixation by the metal lining tube, the top ring is sleeved over an outer circumference wall at a top end of the metal lining pipe, while an outer circumference wall of the top ring fixedly abuts against an inner circumference wall of the stainless steel pipe, and the connecting bolts pass through the stainless steel pipe and are screwed to the metal lining.

By the above technical solution, the metal lining pipes are stably connected with the stainless steel pipe by the heat conductor, forming a stable second space for pouring a concrete pipe.

Optionally, the first pipe section includes a plurality of vertical pipes in communication with each other, the plurality of vertical pipes are all arranged in a first space, and bottom ends of the vertical pipes are fastened to the base.

By the above technical solution, the worker can carry out an ultrasonic detection on the pipe piles through the vertical pipes and classify the quality of the prefabricated pipe piles, such that the pipe piles with higher pouring quality are arranged at the critical support positions, thus ensuring the bearing capacity of the pipe piles at the critical positions.

Optionally, an outer circumference wall at a bottom end of the metal lining pipe and an inner circumference wall of the positioning hole both gradually decrease in diameter in a vertical downward direction.

By the above technical solution, the metal lining pipe can be accurately installed on the base, and the metal lining pipe is more tightly connected to the base under gravity.

Optionally, a plurality of pre-buried pieces are arranged in the second space, the pre-buried piece comprises an annular limiting ring and a connection rod, wherein a diameter of the limiting ring is larger than a diameter of the connection rod, one end of the connection rod is fastened to an inner wall of the stainless steel pipe, the other end of the connection rod is fastened to the limiting ring coaxially.

By the above technical solution, after concrete is injected in the second space, the limiting ring will be buried in the concrete, thus improving integrity of the energy pile.

Optionally, a grouting hole is provided at the bottom end of the stainless steel pipe, the grouting hole communicates the second space with outside, a plurality of communicating holes communicating the second space with outside are provided at the top ring.

By the above technical solution, it is more convenient for the worker to inject the concrete grout into the second space, to know the amount of the concrete grout injected into the pipe pile and to regulate it.

In a second aspect, a construction method of energy pile is disclosed, including:

embedding and securing a second pipe section of a heat exchange pipeline in an embedding recess of a metal lining pipe, putting the metal lining pipe into a stainless steel pipe from top to bottom, so that a bottom of the metal lining pipe is inserted in a positioning hole, and then screwing bolts in from outside of the stainless steel pipe until the bolts are screwed to the metal lining pipe;

injecting grout into a second space through a grouting hole until concrete grout overflows out of a communicating hole;

after solidification of the concrete grout, filling the heat exchange pipeline with water, and conducting an ultrasonic defect detection on pipe piles by an ultrasonic detector, and classifying the pipe piles into high-quality pipe piles and ordinary pipe piles;

classifying force conditions of different pipe pile-positions of a building into main bearing positions and auxiliary bearing positions, and placing the high-quality pipe piles at the main bearing positions and the ordinary pipe piles at the auxiliary bearing positions.

By the above technical solution, the heat exchange capacity of the pipe pile is improved, and a classified control is realized based on the detection of the force performance of the pipe piles, such that the piles with better force performance can be arranged at more important positions, thus improving the force efficiency of the whole pile group.

In a third aspect, a heat pump heat exchange system is enclosed, including a heat exchanger, an air condition circulation system, a connection pipeline, and a plurality of energy piles, the plurality of energy piles are connected in parallel to a group of heat exchange piles through connection of a plurality of connecting pipelines, the first pipe section of each of the energy piles is communicated with a first outlet end of the heat exchanger, the second pipe section of each of the energy piles is communicated with a first inlet end of the heat exchanger, a second outlet end of the heat exchanger is communicated with an inlet end of the air condition circulation system, a second inlet end of the heat exchanger is communicated with an outlet end of the air condition circulation system.

By the above technical solution, the heat exchange system is able to convert geothermal heat to the air condition circulation system through the heat exchanger, thus realizing an effective utilization of geothermal energy.

In summary, at least one of the following beneficial technical effects is realized:

1. Heat exchange efficiency of the energy pile is improved by providing a metal lining pipe and a stainless steel pipe inside the pipe pile to conduct the geothermal heat;
2. The influence of the pipe pile performance on the quality of a building is reduced as far as possible by detecting and classifying the formed pipe piles according to quality and correspondingly designing the installation position of the pipe piles according to the demand;
3. The strength and support capacity of the pipe pile is improved by filling with filling material.

DESCRIPTION OF THE EMBODIMENTS

The present application will be further described in detail below with reference to FIGS. 1-4.

Embodiment 1

Figure 1:
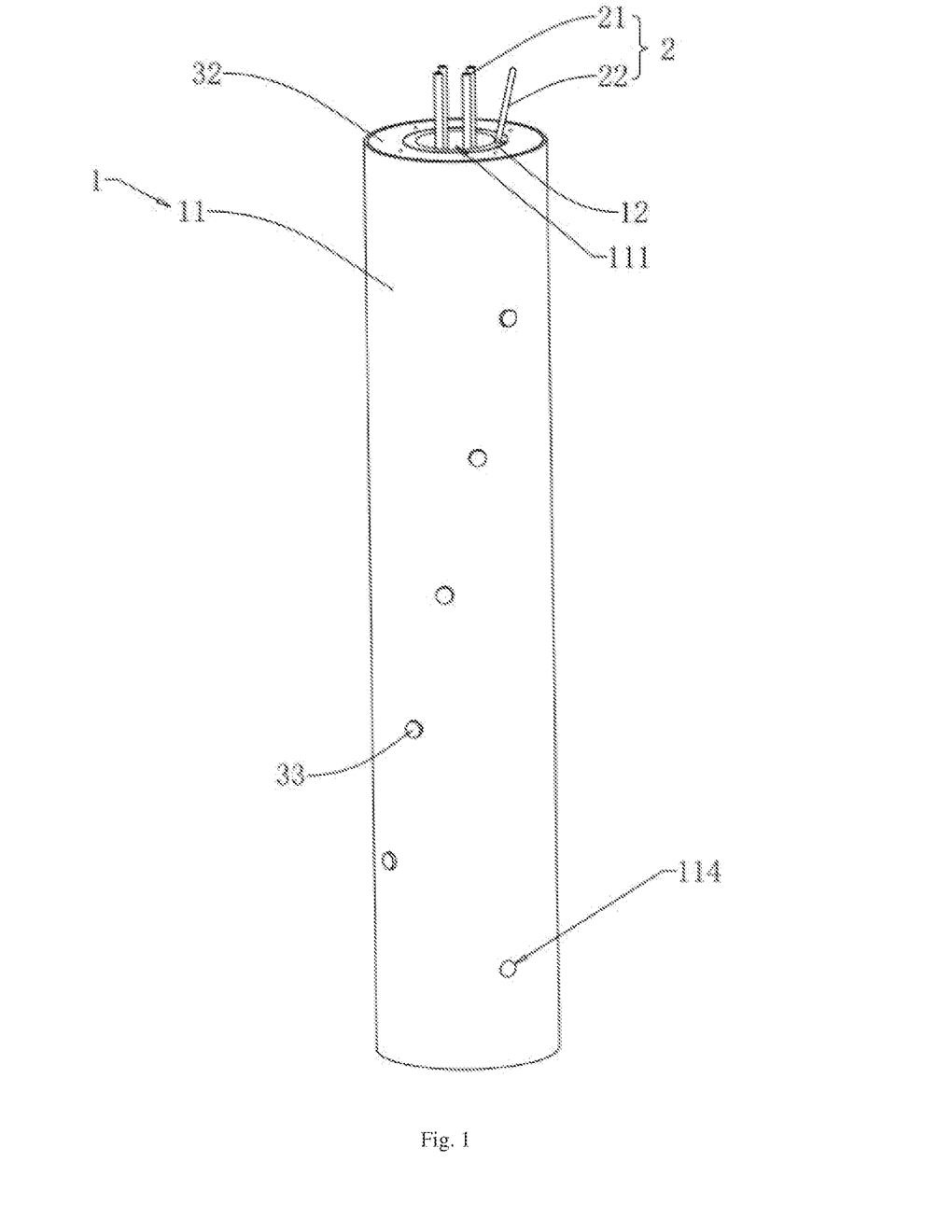
FIG. 1 is an overall structure diagram of an energy pile according to an embodiment of the present application.
Figure 2:
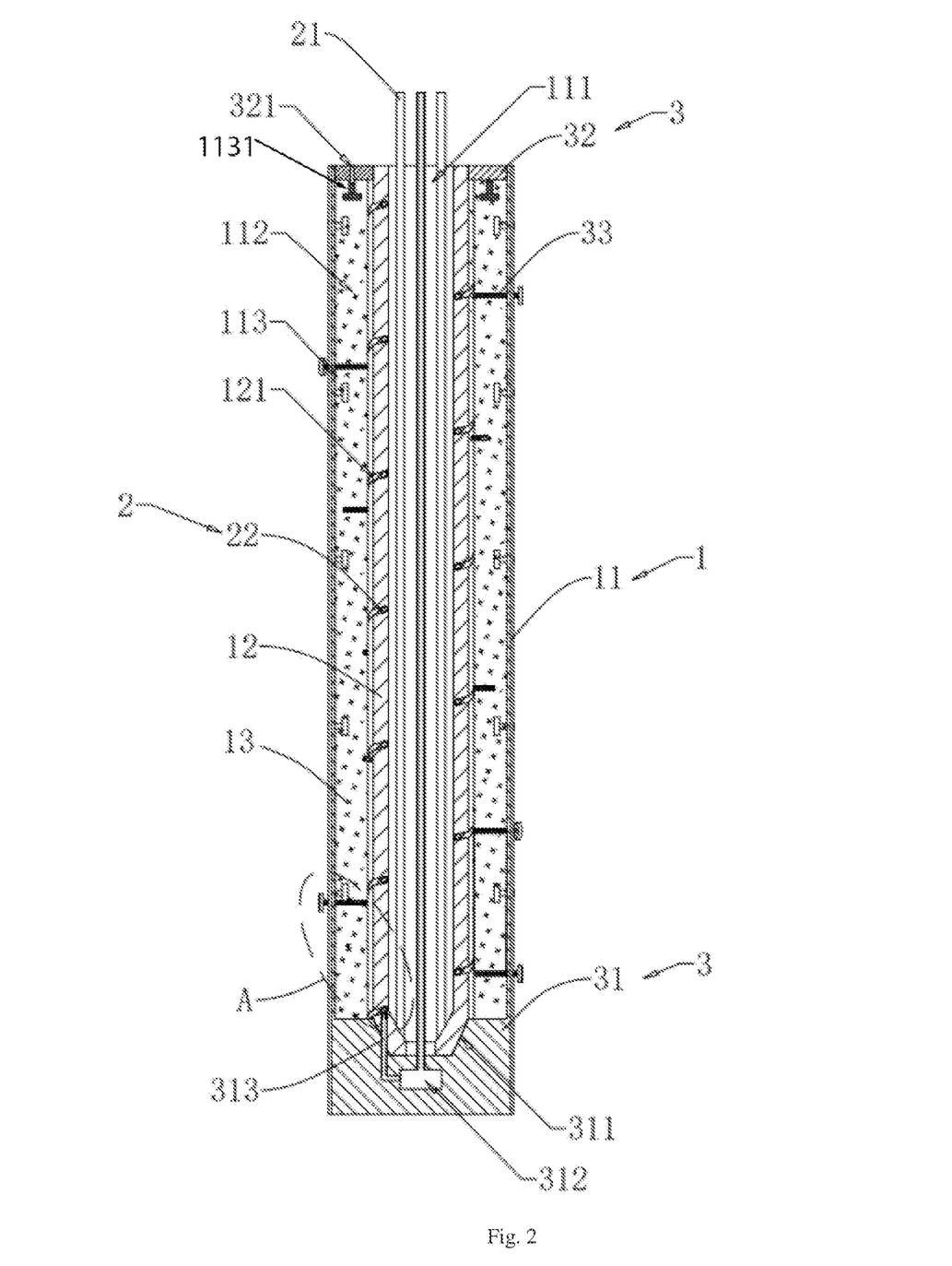
FIG. 2 is a sectional view of an internal structure of an energy pile according to an embodiment of the present application.

A prefabricated energy pile, a construction method, and a heat pump heat exchange system are provided according to the embodiment. Referring to FIGS. 1 and 2, the energy pile includes a pile body 1 and a heat exchange pipeline 2. The pile body 1 includes a stainless steel pipe 11, a metal lining pipe 12 coaxially extending within the stainless steel pipe 11, and a concrete pipe 13 formed by pouring between the metal lining pipe 12 and the stainless steel pipe 11. A heat conductor 3 is fixedly arranged between the stainless steel pipe 11 and the metal lining pipe 12, and the heat conductor 3 is in contact connection with both the stainless steel pipe 11 and the metal lining pipe 12 at the same time. The heat exchange pipeline 2 includes a first pipe section 21 and a second pipe section 22, through which a heat exchange medium flows in turn. A bottom end of the first pipe section 21 is communicated with the second pipe section 22, a top of each of the first pipe section 21 and the second pipe section 22 protrudes upward out of the energy pile, and the second pipe section 22 is in contact connection with the metal lining pipe 12.

When the energy pile is buried underground and the heat exchange medium flows through the heat exchange pipeline 2, the geothermal heat will be transferred into the metal lining pipe 12 and the heat exchange pipeline 2 faster through the stainless steel pipe 11 and the heat conductor 3. The heat exchange medium flowing through the heat exchange pipeline 2 can take away the geothermal heat with higher efficiency, thus improving the heat exchange efficiency between the heat exchange medium in the heat exchange pipeline 2 and the geothermal energy. Further, the metal lining pipe 12 and the stainless steel pipe 11 constitute a molding tool for the pile body 1, which reduces the defects such as hole enlargement, necking, and mud entrapment during the cast molding of concrete underground.

In order to increase the contact area between the metal lining pipe 12 and the second pipe section 22 for further improving the heat exchange efficiency of the energy pile, the second pipe section 22 is configured to be a spiral-shaped, and a spiral-shaped embedding recess 121 is provided on the metal lining pipe 12, which fits with the heat exchange pipeline 2, such that the heat exchange pipeline 2 is completely embedded in the embedding recess 121.

Referring to FIG. 2, the heat conductor 3 includes a base 31, a top ring 32 and a plurality of bolts 33. The base 31 is disc-shaped. The outer circumference wall of the base 31 fixedly abuts against the inner wall at the bottom end of the stainless steel pipe 11. A positioning hole 311 is provided on the base 31, which fits with the bottom end of the metal lining pipe 12. The bottom end of the metal lining pipe 12 is inserted in the positioning hole 311.

The top ring 32 is coaxially fastened to the outer circumference wall at the top end of the metal lining pipe 12, and the outer circumference wall of the top ring 32 abuts against and is welded to the inner circumference wall of the stainless steel pipe 11. Meanwhile, the inner cavity of the stainless steel pipe 11 is divided into a columnar first space 111 and a tubular second space 112 by the metal lining pipe 12. The first pipe section 21 of the heat exchange pipeline 2 is located in the first space 111, and the concrete pipe 13 is cast molded in the second space 112.

The plurality of bolts 33 are arranged helically from top to bottom and extend horizontally between the metal lining pipe 12 and the stainless steel pipe 11. The plurality of bolts 33 pass through the stainless steel pipe 11 and are screwed to the metal lining pipe 12. When the concrete grout is injected into the second space 112, the heat conductor 3 can define the relative position between the metal lining pipe 12 and the stainless steel pipe 11, thus providing a basis for stable forming of the concrete pipe 13.

In order to facilitate the positioning and installation of the metal lining pipe 12, the outer circumference wall at the bottom end of the metal lining pipe 12 and the inner circumference wall of the positioning hole 311 both gradually decrease in diameter in the vertical downward direction. On the one hand, the structure of the positioning hole 311 can guide the installation of the metal lining pipe 12 to a certain extent; and on the other hand, a conical abutment surface can improve the installation tightness of the metal lining pipe 12 and the base 31.

Figure 3:
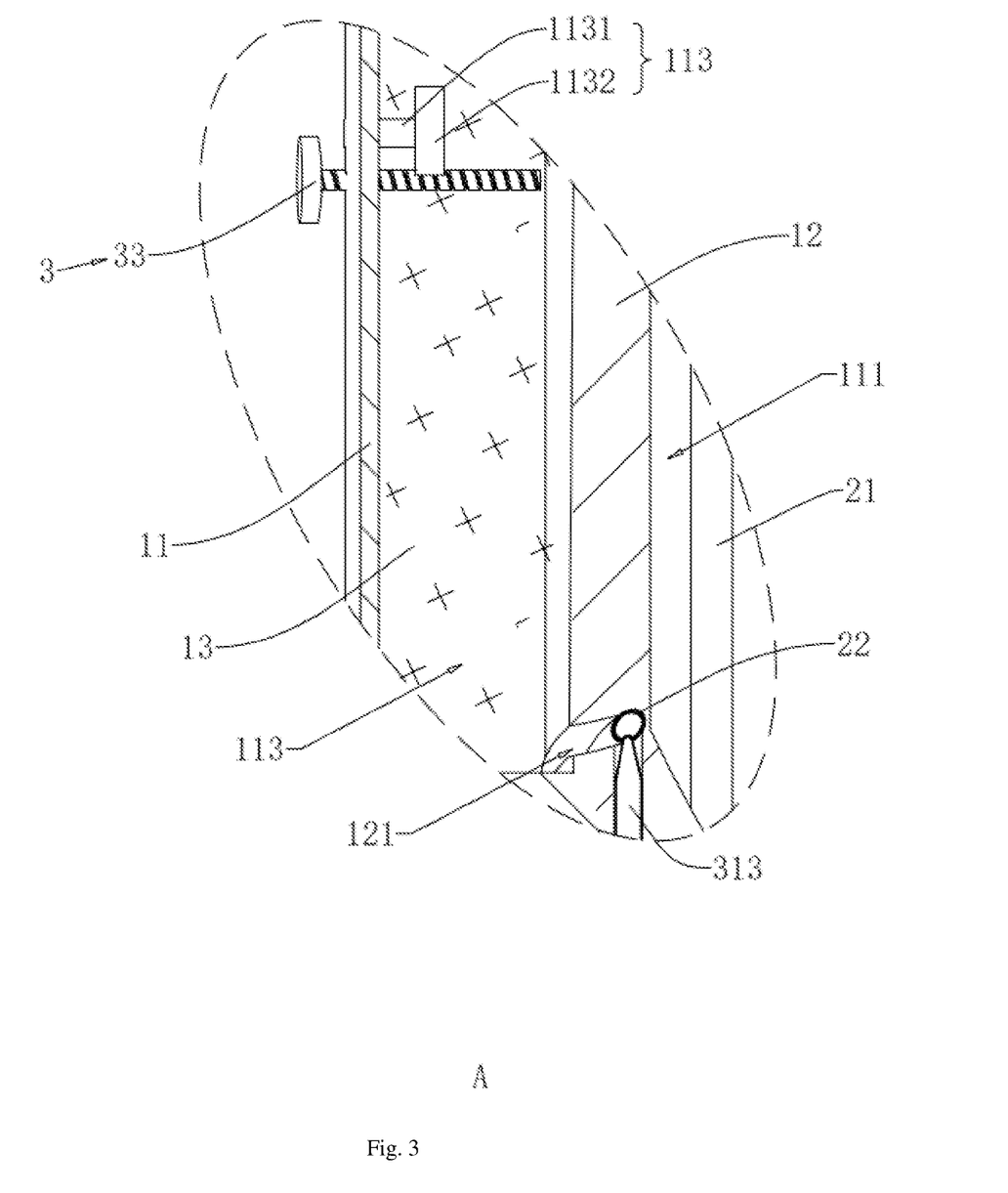
FIG. 3 is an enlarged view of a part A in FIG. 2.

Referring to FIGS. 2 and 3, the second space 112 has a plurality of pre-buried pieces 113 on an inner wall thereof. The pre-buried piece 113 includes an annular limit ring 1132 and a connection rod 1131. The outer diameter of the limiting ring 1132 is larger than the outer diameter of the connection rod 1131. One end of the connection rod 1131 is fastened to the inner wall of the second space 112, and the other end of the connection rod 1131 is fastened to the limiting ring 1132 coaxially.

After the pile body 1 is solidified and formed in the second space 112, the limit ring 1132 will be buried inside the body of the concrete pipe 13, thus driving synchronous movement of the metal lining pipe 12, the stainless steel pipe 11, the heat conductor 3 and the concrete pipe 13, which improves the integrity of the energy pile.

The first pipe section 21 of the heat exchange pipeline 2 includes a plurality of vertical pipes, which are uniformly arranged in the first space 111. The bottom ends of the vertical pipes are fastened to the base 31.

In an embodiment of the present application, four the vertical pipes are provided. The base 31 is provided with a communicating cavity 312 in communication with all four vertical pipes. Further, the base 31 is vertically fastened with an inserting tube 313 in communication with the communicating cavity 312. The lower orifice of the second pipe section 22 protrudes vertically downward out of the surface of the metal lining pipe 12. After the metal lining pipe 12 is inserted in the positioning hole 311, the inserting tube 313 is inserted in the lower orifice of the second pipe section 22, so as to communicate the second pipe section 22 with the communicating cavity 312.

Further, referring to FIGS. 2 and 3, the inner side of the lower orifice of the second pipe section 22 is configured with a flared structure. Correspondingly, the outer side of the top orifice of the inserting tube 313 is configured with an indented structure, to ensure a tight connection between the inserting tube 313 and the second pipe section 22.

A grouting hole 114 connecting the second space 112 with outside is horizontally provided at the lower side wall of the stainless steel pipe 11. A plurality of communicating holes 321 connecting the second space 112 with outside are uniformly provided at the top ring 32. The communicating hole 321 in the present disclosure is arranged coaxially with the connection rod 1131 at the top ring 32. The communicating hole 321 passes through the top ring 32 downwards, extends into the connection rod 1131, and then transversely penetrates through the connection rod 1131 such that the communicating hole 321 is in communication with the second space 112 on the outer circumference wall of the connection rod 1131.

The worker first connects the output pipe of the grouting equipment with the communicating hole 321, and then injects grout into the second space 112. The concrete grout is gradually filled in the second space 112 from bottom to top until the second space 112 is filled, such that the pile body 1 is substantially formed, after which the pile body is lifted and placed in the pile hole.

Embodiment 2

Figure 4:
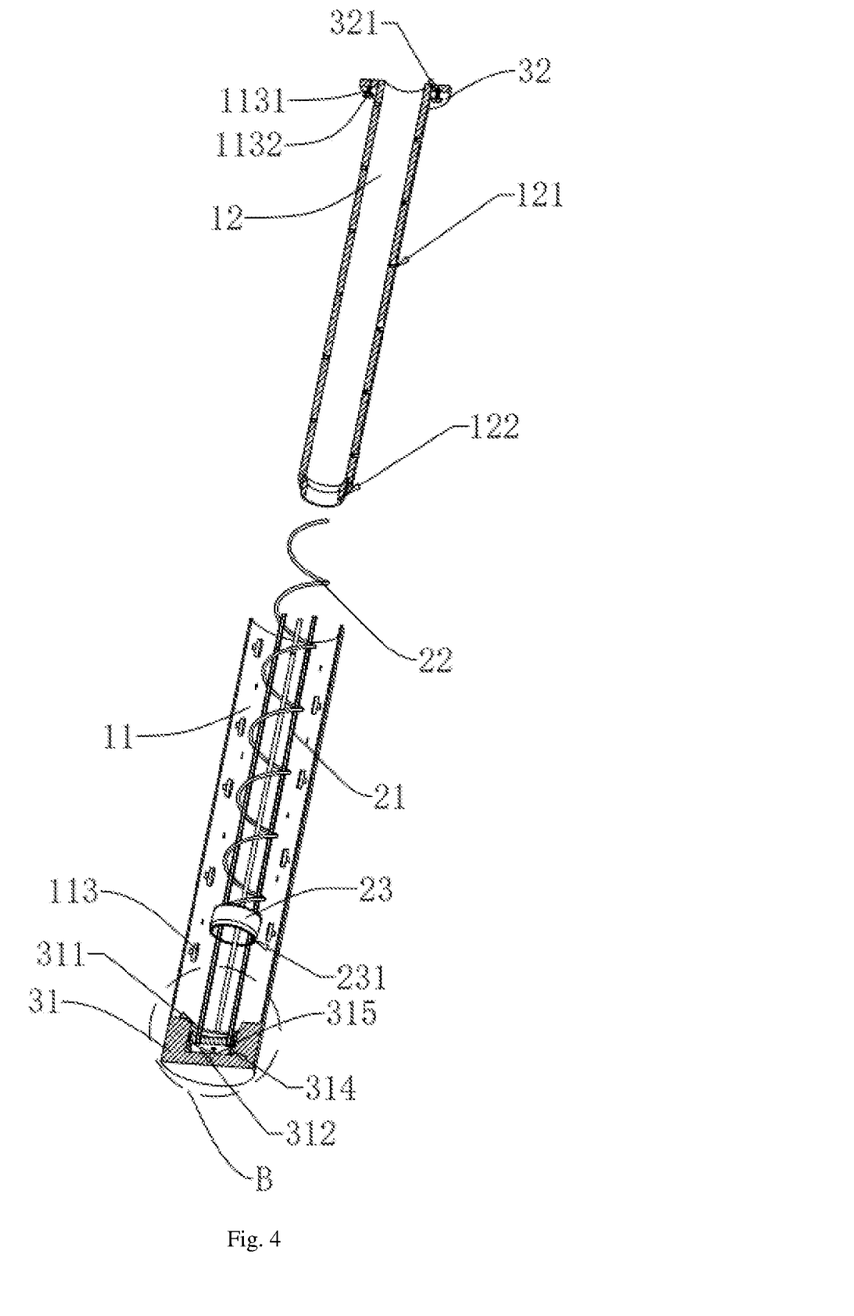
FIG. 4 is an exploded view of an internal structure of a heat pump heat exchange system according to an Embodiment 2 of the present application.
Figure 5:
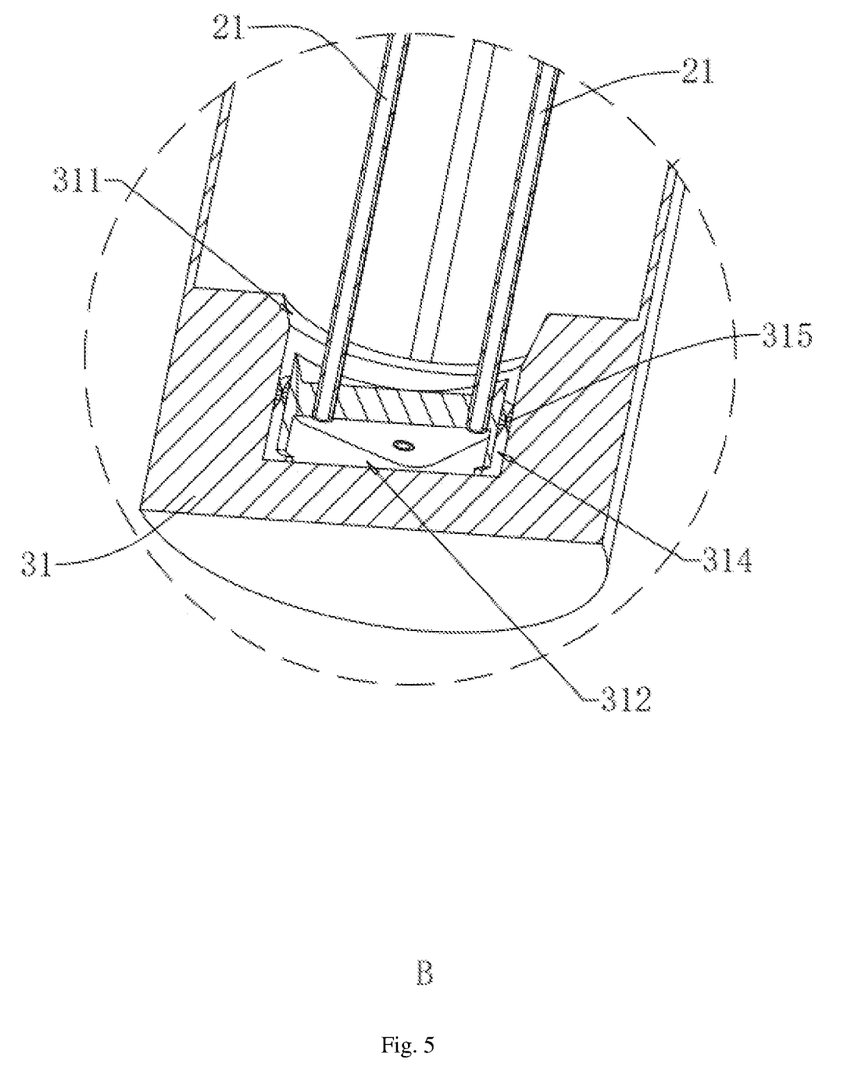
FIG. 5 is an enlarged view of a part B in FIG. 4.

Referring to FIGS. 4 and 5, Embodiment 2 differs from Embodiment 1 in that the structure at the connection position between the second pipe section and the first pipe section 21 is different.

A communicating cavity 312 is provided at the bottom end of the stainless steel pipe. An annular inserting recess 314 is provided coaxially and vertically around the communicating cavity 312. The bottom end of the inserting recess 314 is connected to the bottom end of the communicating cavity 312 through a plurality of voids. The second pipe section 22 is a rigid metal pipe, and the lower end of the second pipe section 22 is fastened with a connecting sleeve 23 in communication with the second pipe section 22. An annular communicating slot 231 is coaxially provided at the lower surface of the connecting sleeve 23 along the annular circumference wall of the connecting sleeve 23. The position of the communicating slot 231 corresponds to the position of the inserting recess 314. The bottom end of the second pipe section 22 is interconnected with the inserting recess 314. An annular communicating opening 122 is coaxially and vertically provided at the lower portion of the metal lining pipe 12, wherein the connecting sleeve 23 is embedded in the communicating opening 122. At the same time, four vertical pipes are uniformly distributed along the inner wall of the metal lining pipe 12. When the metal lining pipe 12 is lowered into the stainless steel pipe 11, the vertical pipes can guide the metal lining pipe 12 to a certain extent, thereby reducing offset when the metal lining pipe 12 is placed.

When installing the second pipe section 22, the worker may first screw the second pipe section 22 into the inserting recess 314 from top to bottom until the top end of the second pipe section 22 protrudes out of the upper surface of the metal lining pipe 12. During this process the worker can adjust the position of the metal lining pipe 12 through the embedding recess 121, to avoid the situation that the second pipe section 22 gets stuck in the inserting recess 314, thus facilitating a smooth installation of the second pipe section 22.

With the screwing in of the second pipe section 22, the upper surface of the connecting sleeve 23 tightly abuts against the top wall of the communicating opening 122, and the lower end of the connecting sleeve 23 protrudes out of the communicating opening 122. The wall thickness at the bottom end of the connecting sleeve 23 gradually decreases, to facilitate the bottom end of the connecting sleeve 23 to be inserted in the inserting recess 314. Two sealing gaskets 315 are fastened to the inner wall of the inserting recess 314 in the middle. After the connecting sleeve 23 has been inserted in the inserting recess 314, the bottom of the connecting sleeve 23 is not in contact with the bottom wall of the inserting recess 314, to ensure the connectivity of the second pipe section 22 with the communication cavity 312, while the two sealing gaskets 315 will be squeezed against the connecting sleeve 23 at the inside and outside of the connecting sleeve 23, to improve sealing effect at the connection position of the heat exchange pipeline 2 and also to simplify the connection operation between the metal lining pipe 12 and the stainless steel pipe 11.

In a second aspect, a construction method of energy pile is disclosed, which including:

Embedding and securing a second pipe section 22 of the heat exchange pipeline 2 in an embedding recess 121 of a metal lining pipe 12, and letting a top end of the second pipe section 22 protrude out of the upper surface of the metal lining pipe 12 while the lower end of the second pipe section 22 extends downwardly to the surface of the metal lining pipe 12;

putting the metal lining pipe 12 into the stainless steel pipe 11 from top to bottom, so that the bottom end of the metal lining pipe 12 is inserted in the positioning hole 311 and the inserting tube 313 is inserted in the lower orifice of the second pipe section 22, and then screwing the bolt 33 in from outside of the stainless steel pipe 11 until the bolt 33 is screwed to the metal lining pipe 12, to fix the metal lining pipe 12 and the stainless steel pipe 11;

injecting grout into the second space 112 through the grouting hole 114 until the concrete grout overflows out of the communicating hole 321;

conducting a first ultrasonic detection on the energy pile after solidification of the concrete grout, to assess the prefabricated energy pile of the pipe pile, and marking the energy piles as high-quality pipe piles when no obvious defects are detected at the energy piles; marking the energy piles as unqualified pipe piles when there is a pile break within the energy piles; marking the remaining energy piles as ordinary pipe piles. usually, there are mud entrapment or voids etc. in the ordinary pipe piles;

filling the first spaces 111 of the energy piles according to the above ratings; filling the high-quality pipe piles with fine stone concrete; filling the first spaces 111 of the ordinary pipe piles with simple green materials such as sand and gravel, thus further supporting and reinforcing the pipe piles of different classes;

arranging force conditions of different pipe pile-positions of a building, and classifying the pipe pile-positions into main bearing positions and auxiliary bearing positions, placing the high-quality pipe piles at the main bearing positions and the ordinary pipe piles at the auxiliary bearing position, so that the pipe pile performance is corresponding to the bearing position of the building, thus minimizing the influence of pipe pile performance on the quality of the building;

conducting a second ultrasonic detection on the energy pile after the energy pile is installed in the building and the heat exchange pipeline 2 is filled with water; the ultrasonic transducer is inserted in vertical pipes, such that the pipe pile can be conducted with an ultrasonic defect detection in the form of flat measurement, incline measurement and sector scan measurement and the quality of the energy piles in the building is evaluated according to the defects, so as to judge the overall support capacity of the group of energy piles in the building, and to reinforce or rework the energy piles with insufficient support capacity.

Figure 6:
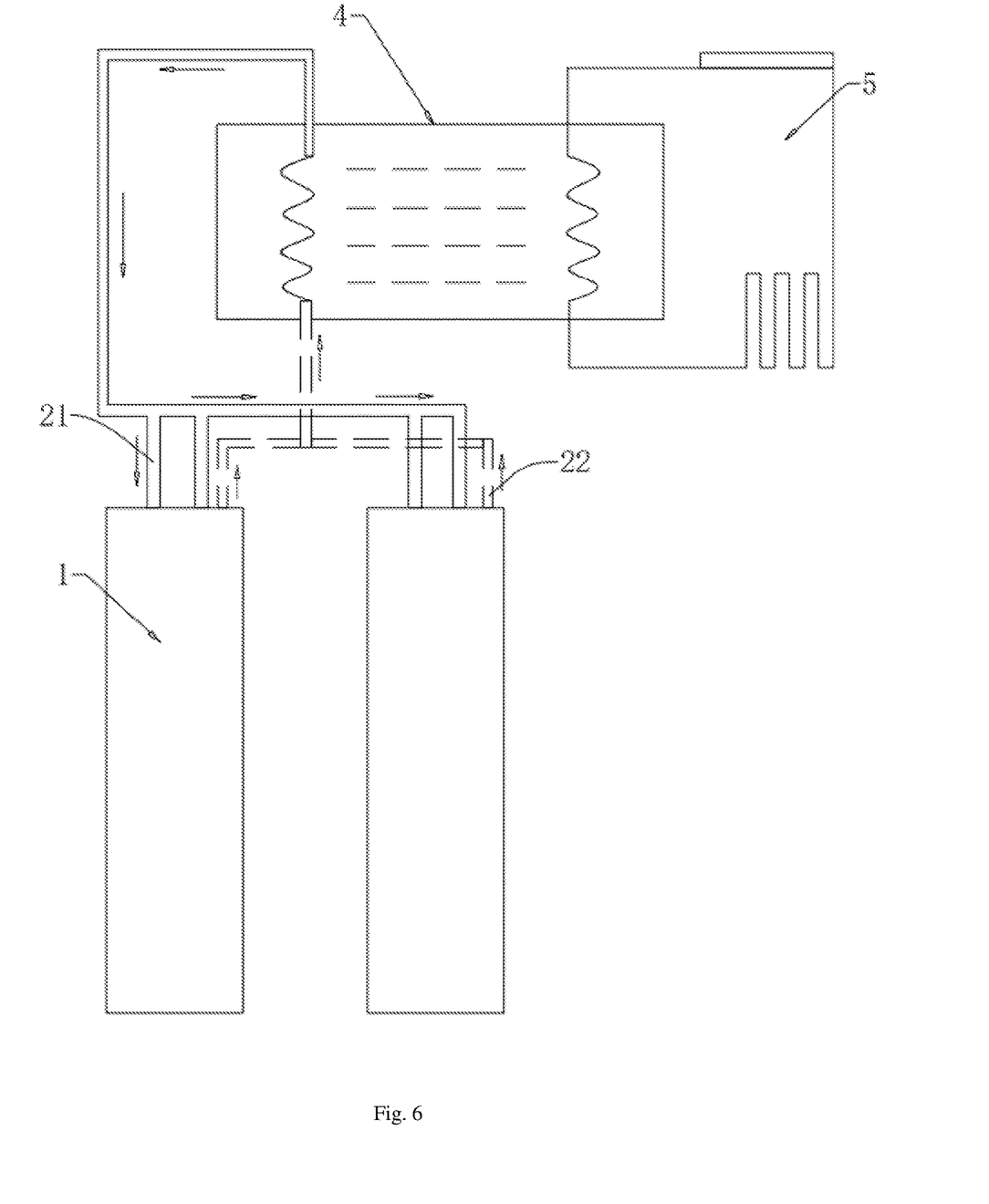
FIG. 6 is a mounting structure diagram of a heat pump heat exchange system according to an embodiment of the present application.

In a third aspect, a heat pump heat exchange system is disclosed. Referring to FIG. 6, the heat pump heat exchange system includes a heat exchanger 4, an air condition circulation system 5, a connection pipeline, and a plurality of energy piles. The plurality of energy piles are connected in parallel to a group of heat exchange piles through connection of a plurality of connecting pipelines. The first pipe sections of the energy piles are all communicated with the first outlet end of the heat exchanger 4, the second pipe sections of the energy piles are all communicated with the first inlet end of the heat exchanger 4. The second outlet end of the heat exchanger 4 is communicated with the inlet end of the air condition circulation system 5, and the second inlet end of the heat exchanger 4 is communicated with the outlet end of the air condition circulation system 5.

When the heat exchange medium in the air condition circulation system 5 passes through the energy piles, it will exchange heat with the geothermal heat. The heat exchange medium with increased temperature will transfer heat into the air condition circulation system 5 in the heat exchanger 4, to provide energy for the air condition circulation system 5, to realize usage of geothermal energy.

The above are the preferred embodiments of this application, which are not to limit the protection scope of this application. Therefore, all equivalent changes made according to the structure, shape and principle of this application should be covered by the protection scope of this application.

What is claimed is:

1. A prefabricated energy pile, comprising:
a pile body, which comprises a stainless steel pipe, a metal lining pipe extending within the stainless steel pipe, and a concrete pipe between the metal lining pipe and the stainless steel pipe, wherein a heat conductor is provided between the stainless steel pipe and the metal lining pipe, and the heat conductor is in contact connection with both the stainless steel pipe and the metal lining pipe at the same time; and
a heat exchange pipeline, which comprises a first pipe section and a second pipe section in communication with each other, wherein a heat exchange medium flows through the first pipe section and the second pipe section in turn, tops of both the first pipe section and the second pipe section protrude upward out of the prefabricated energy pile, the second pipe section is in contact connection with the metal lining pipe, the heat conductor comprises a top ring, a base, and a plurality of connecting bolts, an outer circumference wall of the base fixedly abuts against an inner circumference wall at a bottom end of the stainless steel pipe, a positioning hole is provided at an upper surface of the base, the positioning hole is configured to be inserted for fixation by the metal lining pipe, the top ring is fixedly sleeved on an outer circumference wall at a top end of the metal lining pipe, an outer circumference wall of the top ring fixedly abuts against an inner circumference wall of the stainless steel pipe, and the plurality of connecting bolts pass through the stainless steel pipe and are screwed to the metal lining pipe.

2. The prefabricated energy pile according to claim 1, wherein the second pipe section is spiral-shaped.

3. The prefabricated energy pile according to claim 2, wherein a spiral-shaped embedding recess adapted to the heat exchange pipeline is provided at the metal lining pipe, and the heat exchange pipeline is embedded in the spiral-shaped embedding recess.

4. The prefabricated energy pile according to claim 1, wherein the first pipe section comprises a plurality of vertical pipes, the plurality of vertical pipes are in communication with each other and are all arranged in a first space, and bottom ends of the plurality of vertical pipes are fastened to the base.

5. The prefabricated energy pile according to claim 1, wherein an outer circumference wall at a bottom end of the metal lining pipe and an inner circumference wall of the positioning hole both gradually decrease in diameter in a vertical downward direction.

6. The prefabricated energy pile according to claim 4, wherein a plurality of pre-buried pieces are arranged in a second space, each of the plurality of pre-buried pieces comprises an annular limiting ring and a connection rod, a diameter of the annular limiting ring is larger than a diameter of the connection rod, one end of the connection rod is fastened to an inner wall of the stainless steel pipe, and a second end of the connection rod is fastened to the annular limiting ring coaxially.

7. The prefabricated energy pile according to claim 4, wherein a bottom end of the second pipe section is fastened with a connecting sleeve in communication with the second pipe section, and an annular communicating slot is provided at a lower surface of the connecting sleeve around a spiral axis of the second pipe section;

a communicating cavity in communication with the first pipe section is provided in the base, an annular inserting recess is provided at a position corresponding to the connecting sleeve on the base around the communicating cavity, the communicating cavity is in communication with the annular inserting recess, the connecting sleeve is inserted in the annular inserting recess to communicate the second pipe section with the communicating cavity.

8. The prefabricated energy pile according to claim 6, wherein a grouting hole is provided at the bottom end of the stainless steel pipe, the grouting hole communicates the second space with outside, and a plurality of communicating holes connecting the second space with outside are provided at the top ring.

9. A heat pump heat exchange system, comprising: a heat exchanger, an air condition circulation system, connection pipelines, and a plurality of prefabricated energy piles according to claim 1, wherein the plurality of prefabricated energy piles are connected in parallel to a group of heat exchange piles through connection of a plurality of the connection pipelines, the first pipe section of each of the plurality of prefabricated energy piles is in communication with a first outlet end of the heat exchanger, the second pipe section of each of the plurality of prefabricated energy piles is in communication with a first inlet end of the heat exchanger, a second outlet end of the heat exchanger is in communication with an inlet end of the air condition circulation system, a second inlet end of the heat exchanger is in communication with an outlet end of the air condition circulation system.

* * * * *